United States Patent
Levon et al.

(10) Patent No.: US 7,435,852 B2
(45) Date of Patent: Oct. 14, 2008

(54) METHODS OF PRODUCING A CONJUGATED OLIGOMER EXHIBITING SUPRAMOLECULAR π-CONJUGATION EXTENSION, AND RESULTING PRODUCTS OF SUCH METHODS

(75) Inventors: Kalle Levon, Brooklyn, NY (US); Tsunehiro Sai, New York, NY (US)

(73) Assignee: Polytechnic University, Brooklyn, NY (US)

( * ) Notice: Subject to any disclaimer, the term of this patent is extended or adjusted under 35 U.S.C. 154(b) by 91 days.

(21) Appl. No.: 11/112,717

(22) Filed: Apr. 22, 2005

(65) Prior Publication Data

US 2006/0017045 A1 Jan. 26, 2006

Related U.S. Application Data

(60) Provisional application No. 60/564,500, filed on Apr. 22, 2004.

(51) Int. Cl.
*C07C 211/00* (2006.01)

(52) U.S. Cl. ...................................... 564/305

(58) Field of Classification Search ........................ None
See application file for complete search history.

(56) References Cited

U.S. PATENT DOCUMENTS 5,536,573 A 7/1996 Rubner et al.
6,239,251 B1 * 5/2001 Wei et al. .................... 528/422
6,518,394 B2 * 2/2003 Wei et al. .................... 528/422
2003/0091845 A1 5/2003 Pron et al.

OTHER PUBLICATIONS

Ikkala et al., Synthetic Metals (1997), 84, p. 55-58.*
Macdiarmid et al., Synthetic Metals (1995), 69, p. 85-92.*
Database Caplus on STN, Acc. No. 2004:229081, Taylor et al., Abstracts of Paper, 227th ACS National Meeting, Anaheim, CA, Mar. 28-Apr. 1, 2004, POLY-446 (abstract).*
International Preliminary Report on Patentability (PCT/IB/373) for PCT/US2005/013755, 1 pg., Oct. 25, 2006.
PCT Written Opinion of the International Searching Authority (PCT/ISA/237) for PCT/US2005/013755, 3 pgs., Nov. 2, 2005.
MacDiarmid, A.G., et al., "Secondary doping in Polyaniline," *Synthetic Metals*, vol. 69, pp. 85-92 (1995).
Ikkala, O.T., et al., "Processible polyaniline complexes due to molecular recognition: supramolecular structures based on hydrogen bonding and phenyl stacking," *Synthetic Metals*, vol. 84, pp. 55-58 (1997).

* cited by examiner

*Primary Examiner*—Brian J Davis
(74) *Attorney, Agent, or Firm*—Straub & Pokotylo; John C. Pokotylo

(57) ABSTRACT

Methods for preparing an oligomer exhibiting supramolecular extension of π-conjugation are described. The manipulation of intra-oligomeric properties such as π-conjugation length and the precise architecture(s) resulting from inter-oligomeric variations resulting from supramolecular chemistry offers great promise in the design of nanoscale devices. As shown, self-assembly of the supramolecular structure can be induced by causing a molecule: dopant molar ratio to go beyond the predicted theoretical fully-doped molar ratio.

20 Claims, 5 Drawing Sheets

METHODS OF PRODUCING A CONJUGATED OLIGOMER EXHIBITING SUPRAMOLECULAR π-CONJUGATION EXTENSION, AND RESULTING PRODUCTS OF SUCH METHODS

§ 0. CROSS REFERENCE TO RELATED APPLICATIONS

This application claims the benefit of U.S. Provisional Patent Application Ser. No. 60/564,500 (incorporated herein by reference), titled "SUPRAMOLECULAR EXTENSION OF π-CONJUGATION OLIGOMERS AND MAKING OF THE SAME," filed on Apr. 22, 2004 and naming Kalle Levon, and Tsunehiro Sai as inventors.

§ 1. BACKGROUND

§ 1.1 Field of the Invention

This invention relates generally to the field of supramolecular chemistry and in particular to extended pi-conjugation of oligomers, such as aniline oligomers for example, in solution and in solid-state.

§ 1.2 Background Information

For hundreds of years, chemistry has largely focused on the behavior of molecules and their construction from constituent atoms leading to our present state of high confidence to tackle the construction of most any molecule, be it biological or designed, organic or inorganic, or monomeric or macromolecular in origin. During the last few decades, however, chemists have extended their investigations beyond atomic and molecular chemistry into the realm of "Supramolecular Chemistry."

In general, supramolecular chemistry is the study of interactions between—rather than within—molecules. In other words, chemistry using molecules—rather than atoms—as constituent building blocks for structures beyond the atomic scale. Additionally, whereas traditional chemistry deals with the construction of individual molecules from atoms, supramolecular chemistry involves the construction of organizations of molecular entities on much larger length and size scales. Consequently, terms such as "molecular self-assembly", "self-organizing" and "nanoscience" have become part of the supramolecular chemist's vocabulary. This is a rather new concept in chemistry, introduced by the 1987 Nobel Laureate in Chemistry, Dr. Jean-MarieLehn. (http://nobelprize.org/chemistry/laureates/1987/ or Lehn, J-M., Supramolecular Chemistry, VCH Weinheim, Germany 1995)

The pursuit of supramolecular assembly in electroactive organic conjugated materials has been the subject of much research recently. (See, for example: A. P. H. J. Schenning, P. Jonkheijm, F. J. M. Hoeben, J. van Herrikhuyzen, S. C. J. Meskers, E. W. Meijer, L. M. Herz, C. Daniel, C. Silva, R. T. Phillips, R. H. Friend, D. Beljonne, A. Miura, S. De Feyter, M. Zdanowska, H. Uji-I, F. C. DeSchryver, Z. Chen, F. Wurthner, M. Mas-Torrent, D. denBoer, M. Durkut, and P. Hadley, *Synthetic Metals,* 147, pp. 43-48, 2004; and F. Cacialli, P. Samori, and C. Silva, *Materials Today*, Vol. 4, Issue 2, pp. 24-32, 2004.) As can be appreciated, self-organizing, organic conjugated materials offer up the possibility of materials having highly desired functionalities that cannot appear from a single molecule or ion, such as those (e.g., optoelectrical functions) of polymers for example. Self-assembling supramolecular assemblies of oligomers have some advantages over polymers. One important difference is that the "reversibility" of such self-assembly provides Chemists with great architectural control over such materials at nanoscale levels. This is in contrast to the conventional design of molecular architecture in chemistry involving covalent bonds.

For example in solution for polymers, (See, O. T. Ikkala, L. O. Pietila, P. Passiniemi, T. Vikki, H. Hsterholm, L. Ahjopalo, and J. E. Osterholm *Synthetic Metals,* 84, pp. 55-58, 1997.) molecular interactions between complementary moieties of a conjugated material and solvent—such as hydrogen bonding—as well as other interactions for example, π-π stacking, may promote self-organization to such an extent that well defined, supramolecular structure(s) result. Further study of these interactions will undoubtedly lead to better understanding of the self-organizational processes involved in polymers and oligomers. (See, e.g., M. Muthakumar C. K. Ober, and E. L. Thomas, *Science*, vol. 277, p. 1225, 1977.)

A common problem encountered when processing organic, conjugated materials, is that such polymeric materials exhibit relatively low solubility in common organic solvents. When poor solubility is encountered, the polymer in the solution becomes coiled-up in terms of its backbone conformation, leading to unfavorable aggregation and entanglement problems. This results in undesirable functional properties, mainly due to the conformational defect. This problem is particularly acute with polyaniline (PANi), which is the parental polymer of aniline oligomers.

In an attempt to address some of the problems associated with the intractable nature of common conjugated polymers in solvents, research has been directed to the development of "pseudo-polymeric" materials from conjugated oligomers via supramolecular pathways. (See, for example, Z. V. Vardeny, A. J. Heeger and A. Dodabalapur, *Synthetic Metals*, Vol. 148, pp. 1-3, 2003; and V. F. Razumov, S. B. Brichkin, O. M. Pilugina, T. P. Karpova, S. Z. Vatsadze, D. A. Lemenovskii, M. Schroder, N. R. Champness, M. V. Alfimov, *Russian Chemical Bulletin International Edition*, vol 51 no.3, pp. 476-480, 2002.) One aim of these supramolecular approaches is to replace conjugated polymers with more soluble, well-defined conjugated oligomers which retain the desirable polymeric functional properties, such as high conductivity for example. Unfortunately, only limited success has been realized. (See, e.g., A. G. MacDiarmid and A. J. Epstein, *Synthetic Metals*, Vol. 69, pp. 85-92, 1995; and N. A. Loshkin, O. A. Pyshkina, V. B. Golubev, V. G. Sergeyev, A. B. Zezin, V. A. Kabanov, K. Levon, and S. Piankijsakul, *Macromolecules*, Vol. 34, pp. 5480-5486, 2000.)

Consequently, methods and materials which facilitate the development of these supramolecular approaches would represent a great advance in the art. Such methods and compositions of matter are the subject of the instant invention.

§ 2. SUMMARY OF THE INVENTION

We have developed method(s) of producing a supramolecular extension of π-conjugation in molecules, such as aniline trimer (TANi) for example.

In sharp contrast to prior art investigations of aniline trimers which have limited their TANi:dopant doping molar ratio(s) to 1.0:2.0, we have produced desired doped conjugated oligomer in solution by inducing excess amounts of dopant(s). More generally, rather than limiting molecule:dopant doping molar ratios to the theoretical fully-doped limit, excess doping may be used to induce self-assembly of the molecules. Confirmation of our inventive method is indicated by an observed peak shift in UV-visible spectroscopy.

§ 3. BRIEF DESCRIPTION OF THE DRAWING

Further features and aspects of the present invention may be readily understood from the Drawings.

§ 4. DETAILED DESCRIPTION

Figure 1:
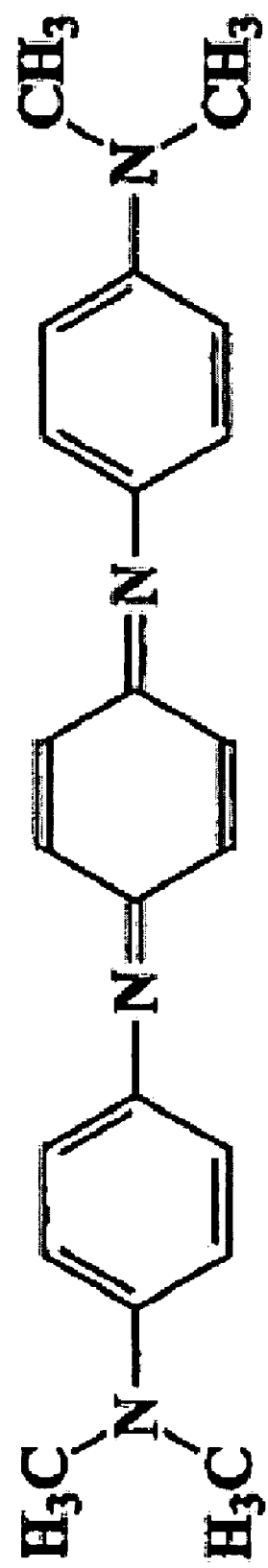
FIG. 1 is a diagram depicting the structure of aniline trimer (TANi).

The following description is presented to enable one skilled in the art to make and use our invention, and is provided in the context of further particular embodiments and methods. The present invention is not limited to the particular embodiments and methods described.

As used below, a "supramolecular assembly" can be thought of as a multi-component system of atoms, ions, and/or molecules which are held together by non-covalent interactions such as hydrogen bonds, van der Waals forces, $\pi$-$\pi$ interactions, and/or electrostatic effects. We hereby define "oligomers" as those of molecules bearing repeating unit of less than 50.

In describing our inventive method(s), we develop a supramolecular extension of $\pi$-conjugation in aniline trimer oligomer (TANi), induced by excess amounts of dopants. By way of further background, the structure of methyl-capped aniline trimer, N-(4-(dimethylamino)phenyl]-N-(4-{(4 dimethylamino)phenyl]imino}-2,5-cyclo-hexadinene-1ylidene)amine (TANi) is shown diagramatically in FIG. 1.

As can be appreciated by those skilled in the art, there are two imine sites of TANi oligomer that are susceptible for doping. Doping in this case specifically refers the oxidation or protonation of the imine units by the dopant to yield a cationic radical salt form. Depending on the length of the oligomer, the number of imines susceptible for doping is varied. For example, in the case of trimers, there are two imine sites, while in the case of heptamers, there are four imine sites available for doping. Those skilled in the art will appreciate that different oligomers or molecules have different, but definite, theoretical fully-doped molecule:dopant molar ratios. Such theoretical fully-doped molar ratios may be related to the dopant and the binding sites (i.e., those sites that are susceptible to doping by the dopant) of the molecule. A dopant can be molecule, which has oxidation strength to oxidize the imines to the cationic radical salt form. The conventional thought is that the theoretical useful maximum molar TANi:dopant doping ratio is 1.0:2.0, where there are two imines per TANi susceptible for doping. Dopant for oxidation and supramolecular assemblies can be same or different.

§ 4.1 EXPERIMENTAL

§ 4.1.1 Synthesis of TANi Trimer

N-[4-(dimethylamino)phenyl]-N-(4-{(4-dimethylamino) phenyl]imino}-2,5-cyclohexadiene-1-ylidene) amine was synthesized according to the following procedure. First, 0.86 g (8 mmol) sample of 4-phenylenediamine was dissolved in substantially 100 ml aqueous 1M HCl and 40 ml ethanol in an iced bath. A 1.8 g (8 mmol) sample of ammonium persulfate was dissolved in 30 ml of distilled water and added to the phenylenediamine solution. Then, 2.0 ml (16 mmol) of N,N'-dimethylaniline was added. After approximately 2 hours, a blue suspension was collected by Buchner funnel and washed with substantially 40 ml 1M HCl followed by 80 ml of distilled water. The product was then treated with 40 ml 1M aqueous solution of ammonium hydroxide for 1.5 hours. The mixture was filtered and washed repeatedly with distilled water. A dark purple powder was obtained and dried overnight in a vacuum. The resulting product was then characterized by mass spectroscopy, from which it was determined that the yield comprised 1 mole of TANI, 344 g/mol.

§ 4.1.2 Dopants

Dodecylbenzenesulfonic acid (DBSAH) was purchased from Tokyo Kasei Co. and was used without further purification.

§ 4.1.3 Measurements

UV-visible absorption spectra were recorded with Shimadzu UV-310PC spectrophotometer, at ambient temperature, using quartz cells having an optical path of 1 cm.

§ 4.1.4 Results

Figure 2:
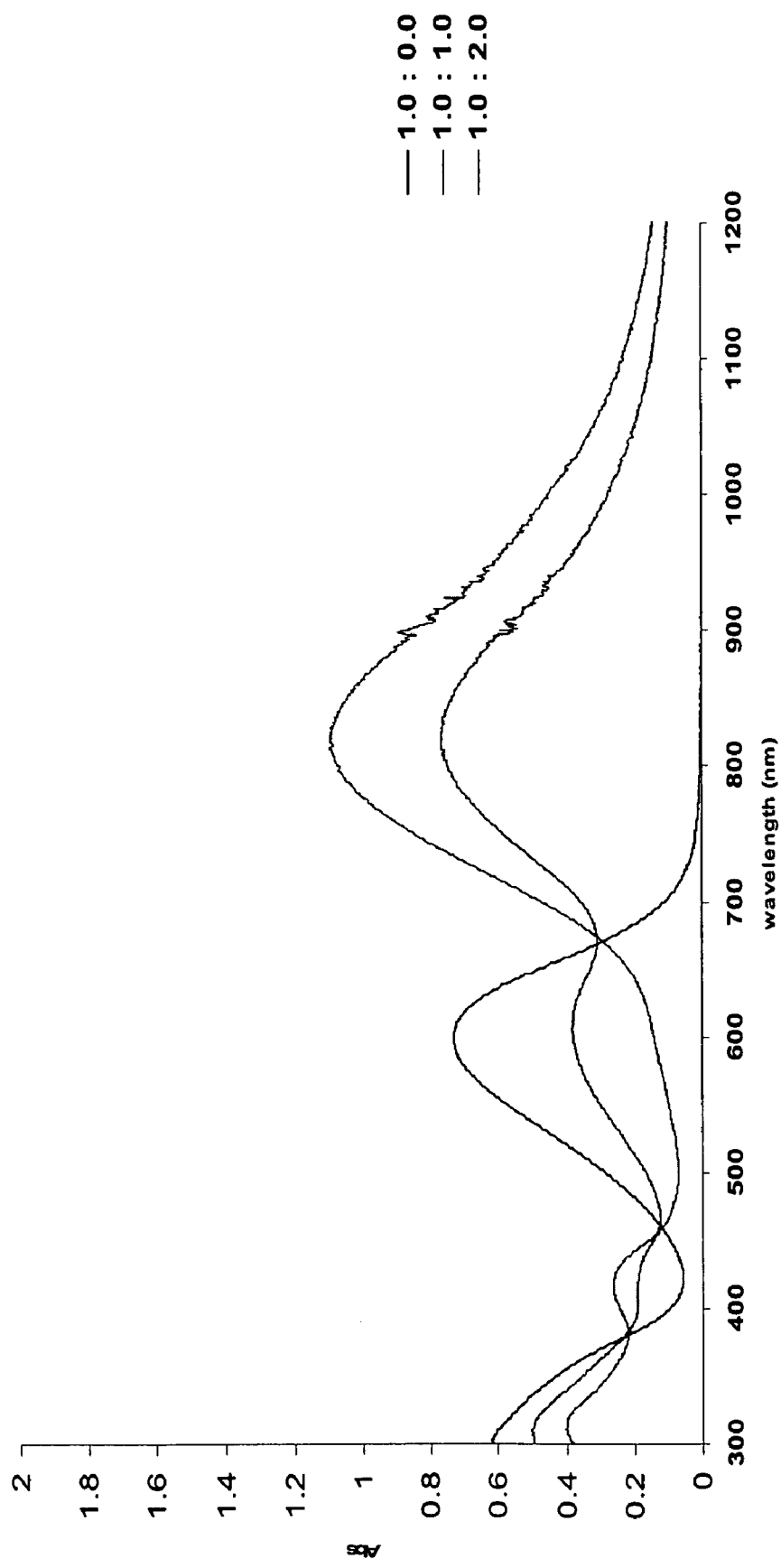
FIG. 2 is a graph showing UV-visible absorption spectra for various doping schemes of TANi:DBSAH in DMF.

Doping or protonation of aniline systems is a well known concept that is central to imparting desired conductive properties to these systems. In the case of aniline trimer or in PANi, when one considers the tetramer as the repeating unit, there are two basic imine sites susceptible for doping by sulfonic acid dopants, thus the theoretical, fully-doped TANi:dopant molar ratio is 1.0:2.0. With reference now to FIG. 2, a typical, prior-art doping scheme of an aniline trimer in solution is shown.

In the case of polyaniline, doping beyond the fully-doped ratio is known to promote further expansion of the protonated polymer backbone along with a further increase in conductivity.

Figure 3:
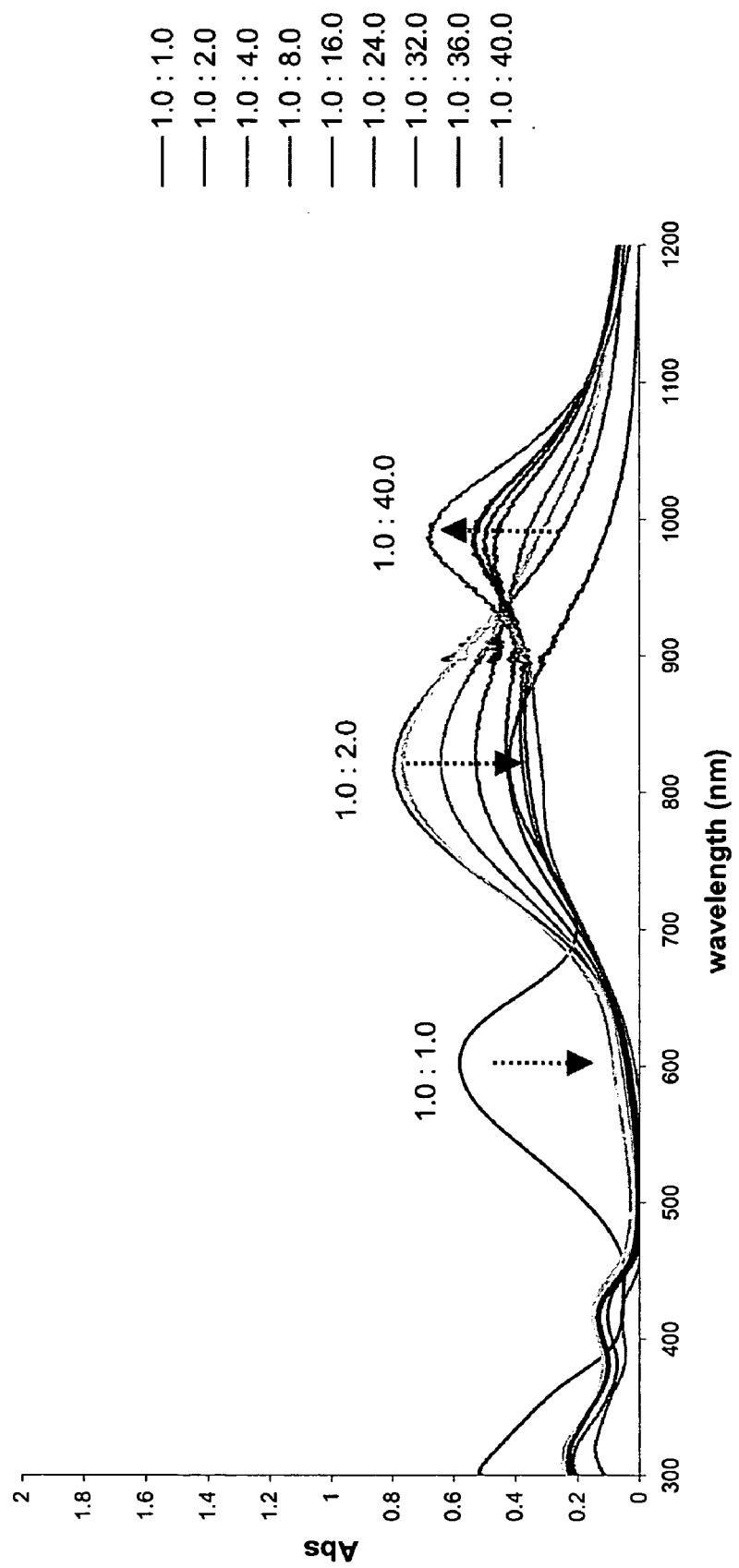
FIG. 3 is a graph showing UV-visible absorption spectra for excess doping of TANi:DBSA in DMF under methods consistent with the present invention.

Unexpectedly, however, when a significantly excessive amount of dopant was systematically added to 1.0:40.0, Tani:Dopant (DBSAH) ratio in DMF, a new red-shifted peak around 990 nm was observed in solution through the use of UV-visible spectroscopy, as is shown in FIG. 3. Notice that the 990 nm peak began appearing at a Tani:Dopant molar ratio of 1:16 (in this case, about 8 times the theoretical fully-doped ratio), and became more pronounced as the ratio increased to 1:40 (in this case, about 20 times the theoretical fully-doped ratio).

When prior-art doping schemes of 1.0:2.0 TANi dopant (DBSA) are employed, the % weight ratio of TANi to dopant is substantially 27.2% wt:72.8% wt, TANi:DBSA, where, in the case of a solution, the solvent composition is not considered. Under these "normal", prior-art conditions, the introduced acid dopant will protonate the two basic imines located symmetrically at the center of the structure, as depicted in FIG. 1.

According to our inventive teachings, and when the doping level is raised to 1.0:40.0, TANi:DBSA, the acidity becomes very high with corresponding weight ratio being substantially 1.8% wt:98.2% wt, TANi:dopant.

§ 4.1.5 Discussion

Figure 4:
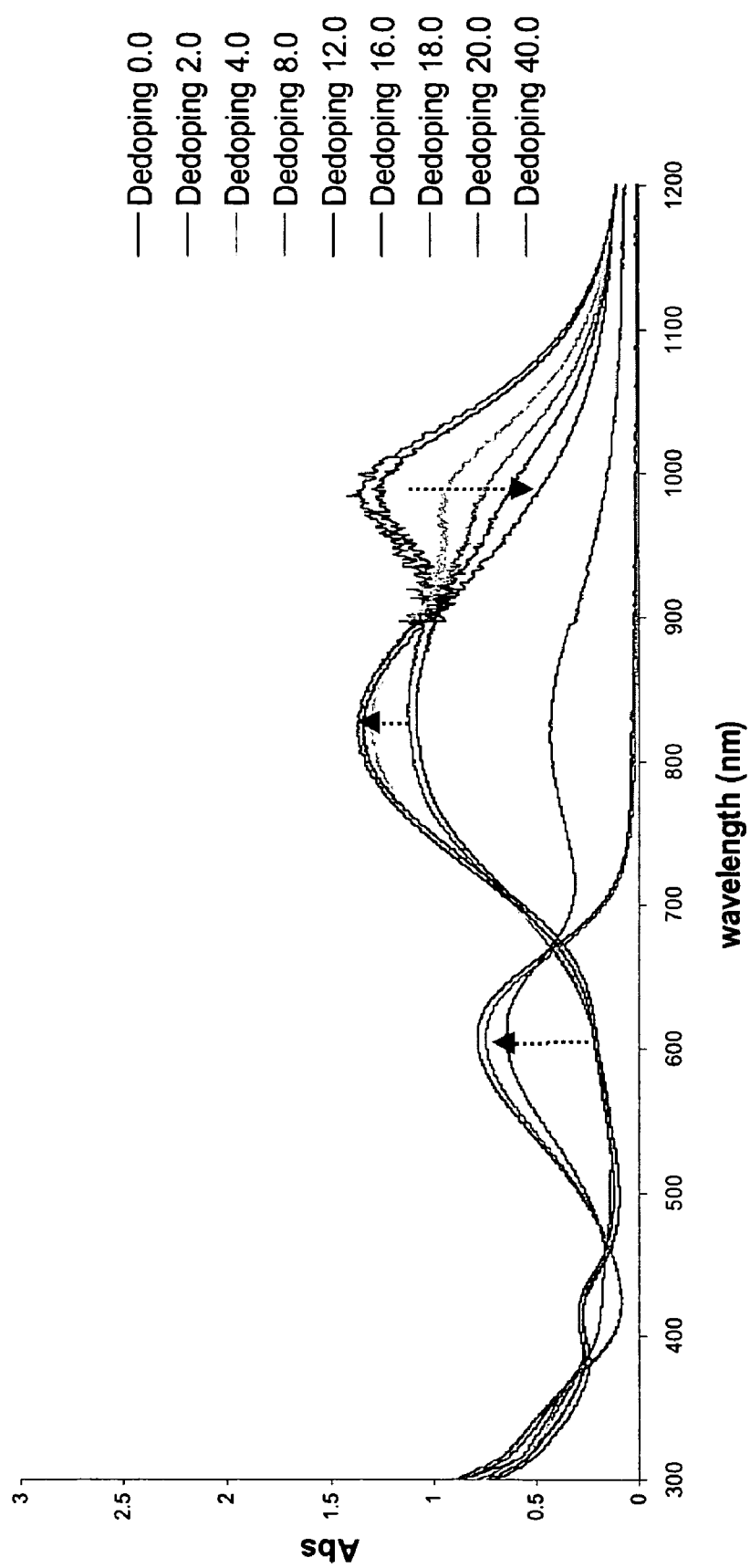
FIG. 4 is a graph showing UV-visible absorption spectra for dedoping of TANI:DBSA (excess) in DMF with NaOH according to the present invention.

In such an extremely acidic condition, we believe that it is possible that both of the terminal N-capped Nitrogens, which are not "functional" under normal, prior-art doping levels, indeed become "functionalized" and therefore capable of interaction with dopant at our excessive dopant levels. Dedoping of the excess doped system was then followed by the introduction of NaOH, from which it observed in FIG. 4 that the system is reversible. As discussed above, "reversibility" is an advantageous attribute of self-assembly in that it provides Chemists with great architectural control over such materials.

By "functionalized" we believe that a lone pair of electrons associated with the terminal methyl capped Nitrogens at both ends of the protonated TANI, will form hydrogen bonds, weak Coulombic interactions, and/or electrostatic interactions with the excess dopant. This excess dopant may act as a "linking agent," interposing itself between the terminal Nitrogens of the protonated TANi, thereby producing a self-organizing, linearly coordinated supramolecular structure in solution, as illustrated schematically in FIG. 5. We do not believe that the terminal Nitrogens are being protonated in our systems, but further study is needed to confirm this.

At this point it is worth noting that prior-art attempts to produce certain linear coordinated systems, have only used inorganic/organometallic dopants of coordinating agents, and not organic dopants, such as DBSAH for example, as we now teach and describe.

Packing or self-organization between these linear structures follows. Primarily promoted by the overlapping of the DBSA-alkyl chains into a lamellar-like structure, we believe that a solution comprising a well-packed, bundle-like supramolecular structure such as that as depicted in FIG. 5 logically results.

Additionally, it is worth noting that $\pi$-$\pi$ interaction between benzyl moieties of TANi may be assisting in the formation of a linear supramolecular structure. (Our earlier studies of TANi have suggested that electrons may hop from one oligomer to another in a tightly packed aggregated structure.) Furthermore, the proximity between the doped oligomers in these supra-structures may promote easier hopping of the charge carrier species, which are responsible for conductivity, from one oligomer to the adjacent oligomer, thus allowing extended conjugation length over several oligomer units. This may explain red-shifted UV-visible peak observed at around 990 nm.

Figure 5:
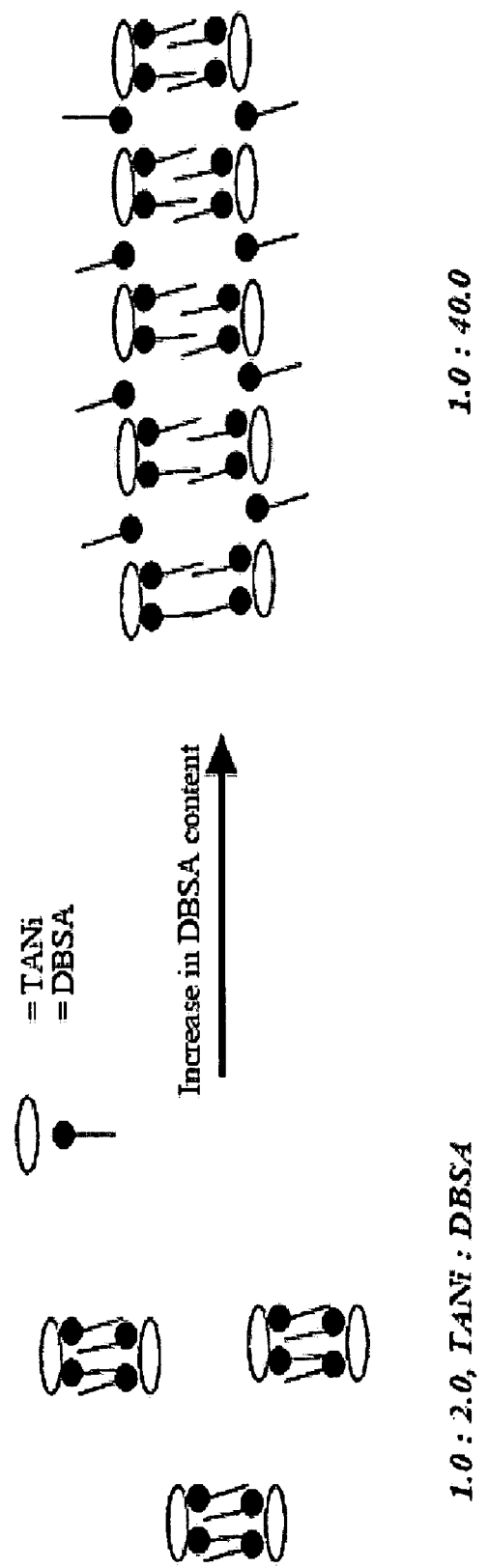
FIG. 5 is a schematic of a possible supramolecular structure produced according to a method consistent with the present invention.

Of course, it is possible that the actual structure so produced may in fact turn out to be much more complex than that shown schematically in FIG. 5. As can be appreciated by those skilled in the art, aniline trimers including those having different isomeric forms of the dicationic doped TANi exist, where one of the bipolaronic species located at the two imines at the center of the oligomer may migrate to the terminal nitrogen to form racemic forms, thereby avoiding steric hinderance with the neighboring polaron. Importantly, aggregation of the linear supramolecular structure into a bundle-like motif may follow as well, similar to PANi-DBSA systems. (See, e.g., W. Y. Zheng, R. H. Wang, K. Levon, Z. Y. Rong, T. Taka, and W. Pan, *Macromolecular Chemistry and Physics*, Vol. 196, pp. 2443-246, 1995.) Finally, we believe that weak interactions such as $\pi$-$\pi$ stackings, Coulombic interactions and hydrogen bonds play a dominant and also a synergistic role in the self-organization of such supramolecular structures.

§ 4.2 ALTERNATIVES

Various modifications to the disclosed embodiments and methods will be apparent to those skilled in the art, and the general principles set forth may be applied to other embodiments, methods and applications. Thus, the present invention is not intended to be limited to the embodiments and methods. For example, although various embodiments of the invention were described in the context of specific aniline oligomer material (One beneficial aspect of aniline trimers is that they represent the shortest repeating unit of an emeraldine base polyaniline.), the teachings of the present application can be applied to materials, such as additional or different molecules or oligomers, and/or additional or different aniline oligomers, in a manner consistent with the present invention. Further, although various embodiments of the present invention were described in the context of DBSA dopant, the teachings of the present application can be applied to other organic, and non-organometallic dopants.

What is claimed is:

1. A method of preparing a supramolecular assembly exhibiting extended $\pi$-conjugation in solution, said method comprising providing, in solution,
   a) molecules; and
   b) an organic dopant, wherein the organic dopant is provided at a concentration sufficient to cause self-assembly of the supramolecular assembly,
      wherein the molecule: dopant molar ratio is beyond the theoretical fully-doped molar ratio.

2. The method according to claim 1 wherein said molecules are oligomers and wherein the supramolecular assembly is a supramolecular oligomer assembly.

3. The method according to claim 1 wherein said molecules comprise an aniline trimer oligimer (TANi), and
   wherein said dopant concentration is such that the TANi:dopant molar ratio is at least about 1.0:16.0.

4. The method according to claim 1 wherein said molecules comprise an aniline trimer oligimer (TANi), and
   wherein said dopant concentration is such that the TANi:dopant molar ratio is in a range between about 1.0:16.0 to about 1.0:40.0 TANi:dopant.

5. The method according to claim 1 wherein said molecules comprise an aniline trimer oligimer (TANi), and
   wherein said dopant concentration is such that the TANi:dopant molar ratio is about 1.0:40.0 TANi:dopant.

6. The method according to claim 1 wherein said molecules comprise an aniline trimer oligimer (TANi), and
   wherein said dopant concentration is such that the TANi:dopant molar ratio is 1.0:40.0 TANi:dopant.

7. The method according to claim 2 wherein said dopant concentration is such that a peak as measured by UV-visible spectroscopy is observed at substantially 990 nm.

8. The method according to claim 2 wherein said oligomer is an aniline.

9. The method according to claim 8 wherein said aniline comprises an aniline trimer oligimer (TANi).

10. The method according to claim 1 wherein the solution includes dimethylformamide (DMF).

11. The method according to claim 1 wherein said organic dopant is a non-organometallic dopant.

12. The method according to claim 1 wherein said organic dopant is Dodecylbenzenesulfonic acid.

13. The method according to claim 2 wherein said organic dopant is Dodecylbenzenesulfonic acid, and
    wherein said oligomer is an aniline.

14. The method according to claim 13 wherein said aniline comprises an aniline trimer oligimer (TANi).

15. The method according to claim 14 wherein said dopant concentration is such that the molecule:dopant molar ratio is in a range between about 1.0:16.0 to about 1.0:40.0 molecule:dopant.

16. The method according to claim 14 wherein said dopant concentration is such that a peak as measured by UV-visible spectroscopy is observed at substantially 990 nm.

17. The method according to claim 1 wherein said dopant concentration is such that a new, red-shifted, UV-visible peak in the solution results.

18. A composition of matter comprising a supramolecular aniline oligomer exhibiting extended π-conjugation in solution, wherein the aniline is an aniline trimer oligimer (TANi).

19. A composition of matter prepared in accordance with the method of claim 1.

20. A composition of matter prepared in accordance with the method of claim 15.

* * * * *